United States Patent
Baron Von Ceumern-Lindenstjerna et al.

(10) Patent No.: US 11,181,024 B2
(45) Date of Patent: Nov. 23, 2021

(54) METHOD FOR OPERATING AN INTERNAL COMBUSTION ENGINE AS WELL AS INTERNAL COMBUSTION ENGINE

(71) Applicant: VOLKSWAGEN AKTIENGESELLSCHAFT, Wolfsburg (DE)

(72) Inventors: Falk-Christian Baron Von Ceumern-Lindenstjerna, Braunschweig (DE); Stefan Paukner, Wolfsburg (DE); André Horn, Braunschweig (DE); Michael Kaack, Rötgesbüttel (DE); Thomas Maischik, Braunschweig (DE); Asmus Carstensen, Osloss (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/663,605

(22) Filed: Oct. 25, 2019

(65) Prior Publication Data

US 2020/0131959 A1  Apr. 30, 2020

(30) Foreign Application Priority Data

Oct. 25, 2018 (DE) ...................... 10 2018 126 618.9

(51) Int. Cl.
*F01N 5/02* (2006.01)
*F01N 3/10* (2006.01)
(Continued)

(52) U.S. Cl.
CPC .............. *F01N 3/101* (2013.01); *F01N 9/00* (2013.01); *F02D 41/008* (2013.01);
(Continued)

(58) Field of Classification Search
CPC ........ F01N 3/101; F01N 5/02; F01N 13/0093; F01N 2240/02; F01N 2240/20; F02D 41/025; F02D 41/008; F02D 41/0082
See application file for complete search history.

(56) References Cited

U.S. PATENT DOCUMENTS

| 10,619,520 B2* | 4/2020 | Juchymenko ........... F01K 25/10 |
| 2010/0205950 A1* | 8/2010 | Hoetger ................ F01K 23/065 60/320 |

(Continued)

FOREIGN PATENT DOCUMENTS

| DE | 43 10 145 A1 | 4/1994 |
| DE | 10 2013 011 477 A1 | 1/2015 |

(Continued)

OTHER PUBLICATIONS

Machine translation of EP-3208450-A1, accessed on Oct. 21, 2020. (Year: 2020).*

(Continued)

*Primary Examiner* — Jonathan R Matthias
(74) *Attorney, Agent, or Firm* — Pearl Cohen Zedek Latzer Baratz LLP

(57) ABSTRACT

The invention relates to method for operating an internal combustion engine that has at least two combustion chambers, of which at least one is operated at a substoichiometric air-fuel ratio and of which at least another is operated at a superstoichiometric air-fuel ratio. The outlet of the internal combustion engine is connected to an exhaust gas system in which a three-way catalytic converter is arranged in the flow direction of an exhaust gas through an exhaust gas channel, and an exhaust gas heat-recovery device is arranged downstream from the three-way catalytic converter. It is provided for the unburned fuel components of the combustion chamber that is operated at a substoichiometric air-fuel ratio to be exothermally reacted with the residual oxygen from the (Continued)

combustion chamber that is operated at a superstoichiometric air-fuel ratio on the three-way catalytic converter, whereby the exhaust gas temperature is raised so that the exhaust gas heat-recovery device can recover a portion of the exhaust gas enthalpy downstream from the three-way catalytic converter.

12 Claims, 3 Drawing Sheets

(51) Int. Cl.
    *F01N 9/00*         (2006.01)
    *F02D 41/00*      (2006.01)
    *F01N 3/08*         (2006.01)
    *F02D 41/14*      (2006.01)

(52) U.S. Cl.
    CPC ........ *F01N 3/0814* (2013.01); *F01N 2240/02* (2013.01); *F01N 2240/20* (2013.01); *F01N 2250/02* (2013.01); *F01N 2430/06* (2013.01); *F01N 2560/025* (2013.01); *F02D 41/1454* (2013.01)

(56) References Cited

U.S. PATENT DOCUMENTS

| | | |
|---|---|---|
| 2011/0265762 A1 | 11/2011 | Lorenz et al. |
| 2012/0198840 A1* | 8/2012 | Stegmaier ................. F02G 5/02 60/605.1 |
| 2015/0013328 A1* | 1/2015 | Carstensen ........... F01K 23/065 60/597 |
| 2015/0089943 A1* | 4/2015 | Hussain .................... F01N 5/02 60/615 |
| 2015/0243866 A1* | 8/2015 | Iriyama ................... F01N 5/025 60/320 |
| 2016/0273433 A1* | 9/2016 | Yamamoto ........... H05H 1/2406 |
| 2016/0273435 A1 | 9/2016 | Hussain et al. |
| 2018/0156142 A1 | 6/2018 | Ulrich et al. |

FOREIGN PATENT DOCUMENTS

| | | | |
|---|---|---|---|
| DE | 10 2016 104 564 A1 | 9/2016 | |
| DE | 10 2017 128 274 A1 | 7/2018 | |
| EP | 3 208 450 A1 | 8/2017 | |
| EP | 3208450 A1 * | 8/2017 | ......... F02D 41/0027 |
| WO | WO 2009/138158 A1 | 11/2009 | |
| WO | WO 2010/112958 A1 | 10/2010 | |

OTHER PUBLICATIONS

Search report for German Patent Application No. 10 2018 126 618.9, dated Jan. 16, 2019.
Extended search report for European Patent Application No. EP 19 20 4457, dated Dec. 20, 2019.

* cited by examiner

METHOD FOR OPERATING AN INTERNAL COMBUSTION ENGINE AS WELL AS INTERNAL COMBUSTION ENGINE

CROSS REFERENCE TO RELATED APPLICATION

This application claims priority from German Patent Application No. 10 2018 126 618.9, filed Oct. 25, 2018, which is incorporated herein by reference in its entirety.

FIELD OF THE INVENTION

The invention relates to a method for operating an internal combustion engine as well as to an internal combustion engine having an exhaust gas aftertreatment system for carrying out such a method according to the generic part of the independent patent claims.

BACKGROUND OF THE INVENTION

German patent application DE 43 10 145 A1 discloses a method for operating an internal combustion engine in which a first group of combustion chambers is operated at a substoichiometric air-fuel ratio and a second group of combustion chambers is operated at a superstoichiometric air-fuel ratio, whereby the unburned fuel components are converted along with residual oxygen on the catalytically active surface of the three-way catalytic converter so that, during idling and at a low load, the three-way catalytic converter is kept at a temperature at which the three-way catalytic converter can efficiently convert pollutants.

U.S. Pat. Appln. No. 2011/0265762 A1 discloses a method for operating an internal combustion engine in which a first cylinder is operated at a substoichiometric air-fuel ratio and, at the same time, a second cylinder is operated at a superstoichiometric air-fuel ratio, so that an essentially stoichiometric exhaust gas is established.

The invention is thus based on the objective of operating the catalytic converters of an internal combustion engine within a temperature range that ensures an efficient conversion of the pollutants and, at the same time, improves the efficiency of the internal combustion engine.

SUMMARY OF THE INVENTION

This objective is achieved by means of a method for operating an internal combustion engine which has at least two combustion chambers and whose outlet is connected to an exhaust gas system, whereby the exhaust gas system has an exhaust gas channel in which at least one three-way catalytic converter is arranged in the flow direction of the exhaust gas of the internal combustion engine and in which an exhaust gas heat-recovery device is arranged downstream from the at least one three-way catalytic converter. It is provided that a first combustion chamber or a first group of combustion chambers of the internal combustion engine is operated at a substoichiometric air-fuel ratio ($\lambda<1$) and a second combustion chamber or a second group of combustion chambers of the internal combustion engine is operated at a superstoichiometric air-fuel ratio ($\lambda>1$), whereby the unburned fuel components from the first combustion chamber or from the first group of combustion chambers of the internal combustion engine are exothermally reacted with the residual oxygen from the second combustion chamber or from the second group of combustion chambers on the three-way catalytic converter, whereby the exhaust gas temperature $T_{EG}$ is raised so that the exhaust gas heat-recovery device can recover a portion of the exhaust gas enthalpy downstream from the three-way catalytic converter.

A method according to the invention makes it possible to keep the components of the exhaust gas aftertreatment system, especially a three-way catalytic converter, at a temperature that allows an effective and efficient conversion of unburned fuel and exhaust gas components in any operating state of the internal combustion engine. At the same time, part of the energy needed for heating can be recovered by means of the exhaust gas heat-recovery device. The exhaust gas heat-recovery system converts the heat into mechanical or electric work and makes it available to the drive or to the on-board system of the vehicle, thereby reducing the overall fuel consumption of the internal combustion engine. Moreover, the method according to the invention can be used if a particulate filter has been installed in the exhaust gas system in order to permit the regeneration of the particulate filter. For this purpose, high exhaust gas temperatures of 600° C. and more are needed in order to oxidize the soot in the particulate filter. It is especially at high exhaust gas temperatures that a great deal of energy is released into the environment via the exhaust gas stream. It is precisely for this reason that it is useful, especially during regeneration of the particulate filter, to convey the exhaust gas stream from the internal combustion engine through the exhaust gas heat-recovery device, thus recovering at least part of the energy that would otherwise be released into the environment without being utilized.

The features cited in the dependent claims comprise advantageous improvements and refinements of the method cited in the independent claim.

In a preferred embodiment of the invention, it is provided for an exhaust gas temperature $T_{EG}$ to be determined, whereby the method is initiated once the exhaust gas $T_{EG}$ has fallen below a threshold temperature $T_S$. If the exhaust gas temperature is below this threshold temperature, only an incomplete conversion of the pollutants from the internal combustion engine can be achieved. This is why the exhaust gas temperature should be raised precisely in this operating state, particularly during idling or at a low load of the internal combustion engine, in order to prevent the three-way catalytic converter from cooling off. In this manner, it can be ensured that an efficient conversion of the pollutants in the exhaust gas of the internal combustion engine is possible at all times.

In another preferred embodiment of the method, it is provided for the internal combustion engine to be configured as a gas engine and to be operated with a gas fuel. Particularly in the case of an internal combustion engine operated with a combustible gas, high catalytic converter temperatures are needed in order to achieve a sufficiently high conversion capacity for unburned methane present in the exhaust gas of the internal combustion engine. This challenge is exacerbated in the case of old catalytic converters and thus becomes worse over the service life of the gas engine. Since a gas engine requires higher exhaust gas temperatures in order to achieve a complete conversion of harmful exhaust gas components than is the case for the conversion of the exhaust gas of diesel or gasoline engines, it is particularly advantageous to use an exhaust gas heat-recovery device.

In this context, it is especially preferred if the internal combustion engine is operated with compressed natural gas (CNG), liquified natural gas (LNG) or biogas. Natural gas and biogas are acquiring ever-greater significance as energy carriers and they generally burn "more cleanly" than gasoline or diesel fuels. For this reason, such fuels are becoming more and more important, especially when it comes to utility vehicles, boat engines or construction machines. The method being proposed here is particularly advantageous in order to carry out an appropriate exhaust gas aftertreatment and to achieve the above-mentioned advantages when the internal combustion engines are operated with these fuels.

In a preferred variant of the method, it is provided for the exhaust gas heat-recovery device to function on the basis of a Clausius-Rankine process. In this context, the exhaust gas heat-recovery device comprises a heat exchanger with a downstream system for energy conversion in which the exhaust gas heat of the internal combustion engine is converted via a vapor circuit into electric or mechanical energy.

In an advantageous variant of the method, it is provided for the energy recovered by means of the exhaust gas heat-recovery device to be converted into mechanical energy. In this context, the mechanical energy can be used, for instance, to drive auxiliary aggregates of the internal combustion engine or of other consumers, as a result of which the efficiency can be improved. As an alternative, it is advantageously provided for the energy recovered by means of the exhaust gas heat-recovery device to be converted into electric energy. The electric energy can be temporarily stored in a battery relatively simply so that it can also be utilized at operating points in time when no additional energy is actually being generated by the exhaust gas heat-recovery device. Moreover, this relieves the standard alternator which, in turn, increases the efficiency of the internal combustion engine. If the energy recovery is advantageously configured, the alternator powered by the internal combustion engine can be dispensed with altogether if the demands of the on-board system are being met by the energy recovered from the exhaust gas.

In a preferred embodiment of the invention, it is provided that the first combustion chamber or a group of first combustion chambers is operated at a substoichiometric air-fuel ratio ($\lambda<1$) and a second combustion chamber or a second group of combustion chambers is operated at a superstoichiometric air-fuel ratio ($\lambda>1$), whereby a stoichiometric exhaust gas is established downstream from the outlet of the internal combustion engine. A stoichiometric exhaust gas can achieve a very efficient exhaust gas purification. This holds true particularly if a second three-way catalytic converter has been installed downstream from the first three-way catalytic converter and an essentially homogenous stoichiometric exhaust gas flows to this second three-way catalytic converter after the unburned fuel components have been exothermally reacted with the residual oxygen on the catalytically active surface of the first three-way catalytic converter.

According to the invention, an internal combustion engine having at least a first combustion chamber and at least a second combustion chamber is being put forward, whereby an outlet of the internal combustion engine is connected to an exhaust gas system, whereby the exhaust gas system has an exhaust gas channel in which at least one three-way catalytic converter is arranged in the flow direction of an exhaust gas of the internal combustion engine through the exhaust gas channel, and an exhaust gas heat-recovery device is arranged downstream from the three-way catalytic converter, and the internal combustion engine also has an engine control unit that is configured to carry out a method according to the invention when a machine-readable program code is executed by the engine control unit. Such an internal combustion engine allows an easy implementation of a method according to the invention, as a result of which the efficiency of the internal combustion engine is increased and, at the same time, the efficiency of the exhaust gas treatment can be improved due to a greater conversion capacity.

In a preferred embodiment of the internal combustion engine, it is provided for a particulate filter to be installed downstream from the three-way catalytic converter and upstream from the exhaust gas heat-recovery device. Even though the fuel of gas engines burns fundamentally more cleanly in the combustion chambers than in the case of gasoline or diesel engines and consequently, as a matter of principle, far fewer soot particles are generated during combustion, a particulate filter can further lower these particle emissions. This is especially the case when the internal combustion engine can be alternately operated with gas or with gasoline and an appropriate exhaust gas treatment is also to be made possible during operation with gasoline.

In an advantageous variant of the internal combustion engine, it is provided for a bypass to be installed in order to bypass the exhaust gas heat-recovery device, thus making it possible for the exhaust gas of the internal combustion engine to bypass the exhaust gas heat-recovery device. Thanks to the bypass, the exhaust gas can bypass the exhaust gas heat-recovery device. Bypassing the exhaust gas heat-recovery device is effectuated when the engine operating point continuously exceeds the maximum power uptake of the exhaust gas heat-recovery device, for instance, during full load operation. As a result, the flow resistance and consequently the exhaust gas counterpressure can be reduced in the exhaust gas system, thereby improving the efficiency of the internal combustion engine. The power input into the exhaust gas heat-recovery device can be regulated by means of the bypass if the on-board system or the battery of the vehicle is no longer able to take up more energy or if no further heat input into the cooling system of the vehicle via the condenser of the exhaust gas heat-recovery device is permissible any more.

In another improvement of the internal combustion engine, it is provided for an exhaust gas valve to be installed in the bypass. An exhaust gas valve in the bypass allows the bypass to be closed in a simple manner. This ensures that, except for a small leakage volume, the entire exhaust gas stream flows through the exhaust gas heat-recovery device. Moreover, the exhaust gas valve makes it easy to switch over between bypass operation and exhaust gas heat-recovery operation.

In an advantageous embodiment of the internal combustion engine, it is provided for a second three-way catalytic converter to be arranged downstream from the three-way catalytic converter and upstream from the exhaust gas heat-recovery device. Here, a heterogenous exhaust gas containing unburned fuel components as well as residual oxygen flows to the first three-way catalytic converter. Thanks to the downstream second three-way catalytic converter to which an essentially homogenous stoichiometric exhaust gas flows after the unburned fuel components have been exothermally reacted on the catalytically active surface of the first three-way catalytic converter, a greatly improved conversion capacity is achieved in terms of limiting the pollutants in the exhaust gas of the internal combustion engine.

In this context, it is particularly preferable if, downstream from the second three-way catalytic converter, the bypass branches off from the exhaust gas channel at a branch and then, downstream from the exhaust gas heat-recovery device, it opens up again into the exhaust gas channel at an opening. This ensures that the exhaust gas stream continuously flows through all of the components for the exhaust gas aftertreatment of the internal combustion engine and that the exhaust gas heat-recovery device can be quite easily activated and deactivated by means of the bypass.

In another embodiment of the invention, it is provided for the heterogenous exhaust gas that flows to the first three-way catalytic converter to be homogenized by means of an additional exhaust gas mixer. The homogenization of the exhaust gas already upstream from the first three-way catalytic converter further improves the conversion behavior of the entire exhaust gas system.

In another preferred embodiment of the internal combustion engine, it is provided for the internal combustion engine to be an internal combustion engine that is charged by means of an exhaust gas turbocharger and operated with a gas. Since the exhaust gas aftertreatment of gas engines requires a high temperature in comparison to that for other internal combustion engines, it is precisely for such gas engines that it is advantageous for an appropriate exhaust gas heat-recovery device to be integrated into the exhaust gas system.

Unless otherwise indicated in an individual case, the various embodiments of the invention put forward in this application can be advantageously combined with each other.

BRIEF DESCRIPTION OF THE DRAWINGS

The invention will be explained below in embodiments on the basis of the accompanying drawings. In this context, identical components or components having the same function are designated by the same reference numerals in the various figures. The following is shown.

DETAILED DESCRIPTION OF THE INVENTION

Figure 1:
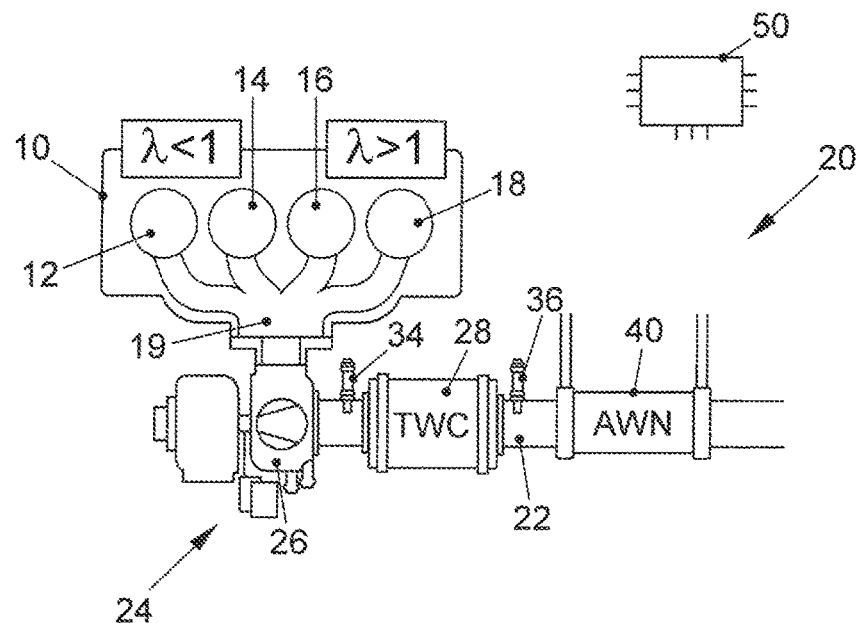
FIG. 1: a first embodiment of an internal combustion engine according to the invention, with an exhaust gas aftertreatment system.

FIG. 1 shows an internal combustion engine 10 having a plurality of combustion chambers 12, 14, 16, 18. By way of an example, FIG. 1 shows an internal combustion engine 10 having four combustion chambers 12, 14, 16, 18. Fundamentally, internal combustion engines 10 with two or more combustion chambers 12, 14, 16, 18 are possible. The internal combustion engine 10 is preferably configured as a gas engine and it is operated with a gaseous fuel, especially compressed natural gas (CNG), liquefied natural gas (LNG) or biogas. The outlet 19 of the internal combustion engine 10 is connected to an exhaust gas system 20 that encompasses an exhaust gas channel 22. In the direction in which an exhaust gas of the internal combustion engine 10 flows through the exhaust gas channel 22, there is a three-way catalytic converter 28 as the first component of the exhaust gas aftertreatment system. Downstream from the three-way catalytic converter 28, there is an exhaust gas heat-recovery device 40. The internal combustion engine 10 is preferably configured as an internal combustion engine 10 that is charged by means of at least one exhaust gas turbocharger 24. For this purpose, a turbine 26 of the exhaust gas turbocharger 24 is installed downstream from the outlet 19 of the internal combustion engine 10 and upstream from the three-way catalytic converter 28, said turbine driving a compressor in the intake system of the internal combustion engine 10 in order to increase the amount of fresh air fed into the combustion chambers 12, 14, 16, 18. A first lambda sensor 34, preferably a wideband sensor, is arranged upstream from the three-way catalytic converter 28. A second lambda sensor 36 is arranged downstream from the three-way catalytic converter 28 and upstream from the exhaust gas heat-recovery device 40. In a familiar manner, the lambda sensors 34, 36 are connected by means of signal lines (not shown here) to an engine control unit 50 of the internal combustion engine 50 [sic] and the air-fuel ratio $\lambda$ of the internal combustion engine 50 [sic] can be regulated via these lines, preferably individually for each combustion chamber.

When gas is burned in internal combustion engines, there is a need for a high temperature in the three-way catalytic converter 28 in order to allow the three-way catalytic converter 28 to efficiently convert unburned methane. This problem is exacerbated in old three-way catalytic converters 28. Although in principle an exhaust gas turbocharger 24 contributes to raising the efficiency of the internal combustion engine 10, it likewise removes enthalpy from the exhaust gas stream via the turbine 26 that is being used to drive the compressor of the exhaust gas turbocharger 24. Consequently, in the case of a gas-powered internal combustion engine 10, the charging of the internal combustion engine 10 exacerbates the challenge when it comes to achieving a sufficient conversion capacity of the three-way catalytic converter 28. In order to raise the exhaust gas temperature $T_{EG}$, a first group of combustion chambers 12, 14 of the internal combustion engine 10 is operated at a substoichiometric air-fuel ratio $\lambda<1$ and a second group of combustion chambers 16, 18 is operated at a superstoichiometric air-fuel ratio $\lambda>1$, so that an essentially stoichiometric exhaust gas is established downstream from the outlet of the internal combustion engine 10. The unburned fuel components—especially unburned hydrocarbons HC, particularly methane, hydrogen and/or carbon monoxide CO—from the combustion chambers 12, 14 operated at a substoichiometric air-fuel ratio $\lambda<1$ are exothermally reacted on the catalytically active surface of the three-way catalytic converter 28 with the residual oxygen from the combustion chambers 16, 18 operated at a superstoichiometric air-fuel ratio $\lambda>1$, as a result of which the three-way catalytic converter 28 and the exhaust gas stream downstream from the three-way catalytic converter 28 are heated up. In order not to emit this heat into the environment without utilizing it, an exhaust gas heat-recovery device 40 is provided downstream from the three-way catalytic converter 28 and this unit serves to recover a portion of the exhaust gas enthalpy in the form of mechanical or electric energy. The exhaust gas heat-recovery device 40 can especially encompass an exhaust gas heat exchanger with a downstream system for energy transformation, whereby the carrier medium of the system for energy transformation is heated up by the exhaust gas stream of the internal combustion engine 10 and made available to a vapor circuit. Alternatively, there are also other possibilities for exhaust gas heat recovery such as, for instance, thermoelectric generators (TEG).

The method according to the invention provides a heating function and a keep-warm function for the three-way catalytic converter 28 in order to ensure a high temperature for the three-way catalytic converter 28. An advantage of the lambda-split method, in other words, a mode of operation of the internal combustion engine 10 in which a first group of combustion chambers 12, 14 is operated at a substoichiometric air-fuel ratio and a second group of combustion chambers 16, 18 is operated at a superstoichiometric air-fuel ratio, consists of the fact that the additional fuel consumption due to the heating measure is partially compensated for by an improvement in the efficiency of the combustion chambers 16, 18 that are operated at a superstoichiometric air-fuel ratio $\lambda>1$. When, in the manner according to the invention, this method is combined with an exhaust gas heat-recovery device 40 provided downstream from the three-way catalytic converter 28, the residual heat of the exhaust gas can be utilized so that the efficiency can be raised and the consumption can be further reduced. Moreover, in the case of driving profiles involving high load states of the internal combustion engine 10, the exhaust gas heat-recovery device 40 can also be used without engine-related heating measures in order to utilize some of the waste heat of the exhaust gas, thereby further improving the efficiency of the overall system. Such driving profiles occur especially in cases where the internal combustion engine 10 according to the invention is employed to drive a utility vehicle, when the internal combustion engine of the vehicle is operated at such a power due to the load or the topography of the road.

Figure 2:
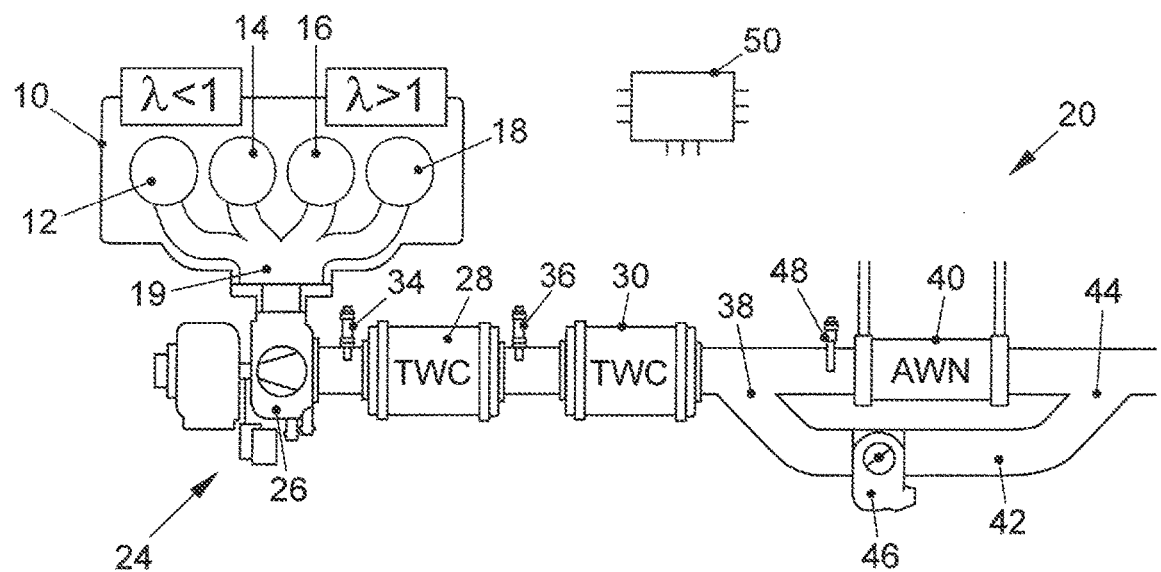
FIG. 2: a preferred embodiment of an internal combustion engine according to the invention, with an exhaust gas aftertreatment system.

FIG. 2 shows a preferred embodiment of an internal combustion engine 10 according to the invention. The internal combustion engine 10 has several combustion chambers 12, 14, 16, 18, especially four or more combustion chambers 12, 14, 16, 18. The outlet 19 of the internal combustion engine 10 is connected to an exhaust gas system 20. The exhaust gas system 20 encompasses an exhaust gas channel 22 where, in the flow direction of the exhaust gas of the internal combustion engine 10, a first three-way catalytic converter 28 is arranged downstream from the outlet, a second three-way catalytic converter 30 is arranged downstream from the first three-way catalytic converter 28 and an exhaust gas heat-recovery device 40 is arranged further downstream. Downstream from the second three-way catalytic converter 30, a bypass 42 branches off from the exhaust gas channel 22 at a branch 38 and then opens up again into the exhaust gas channel 22 at an opening 44 downstream from the exhaust gas heat-recovery device 40. An exhaust gas valve 46 is installed in the bypass 42 and it serves to close the bypass 42 so that the latter is configured as a switchable bypass 42 and the exhaust gas stream can be alternately conveyed through the exhaust gas heat-recovery device 40 situated in the exhaust gas channel 22 or else through the bypass 42. Moreover, there can also be a temperature sensor 48 in the exhaust gas channel 22 in order to determine the exhaust gas temperature or the temperature of one of the exhaust gas aftertreatment components 28, 30 or of the exhaust gas heat-recovery device 40.

The internal combustion engine 10 is preferably configured as an internal combustion engine 10 charged by means of at least one turbocharger 24. For this purpose, a turbine 26 of the exhaust gas turbocharger 24 is installed downstream from the outlet 19 of the internal combustion engine 10 and upstream from the three-way catalytic converter 28, said turbine driving a compressor in the intake system of the internal combustion engine 10 in order to increase the amount of fresh air fed into the combustion chambers 12, 14, 16, 18. A first lambda sensor 34, preferably a wideband sensor, is arranged downstream from the turbine 26 and upstream from the three-way catalytic converter 28. A second lambda sensor 36, which can likewise be configured as a wideband sensor or alternatively as a Nernst sensor, is arranged downstream from the first three-way catalytic converter 28 and upstream from the second three-way catalytic converter 28.

The first three-way catalytic converter 28 is preferably installed in the exhaust gas channel 22 in a position near the engine. In this context, the expression "position near the engine" refers to a position having an exhaust gas travel distance of less than 80 cm, especially less than 50 cm, from the outlet of the internal combustion engine 10. The second three-way catalytic converter 30 is preferably installed in a position far from the engine. In this context, the expression "position far from the engine" refers to a position in the exhaust gas system 20 having an exhaust gas travel distance of more than 150 cm from the outlet of the internal combustion engine 10.

Figure 3:
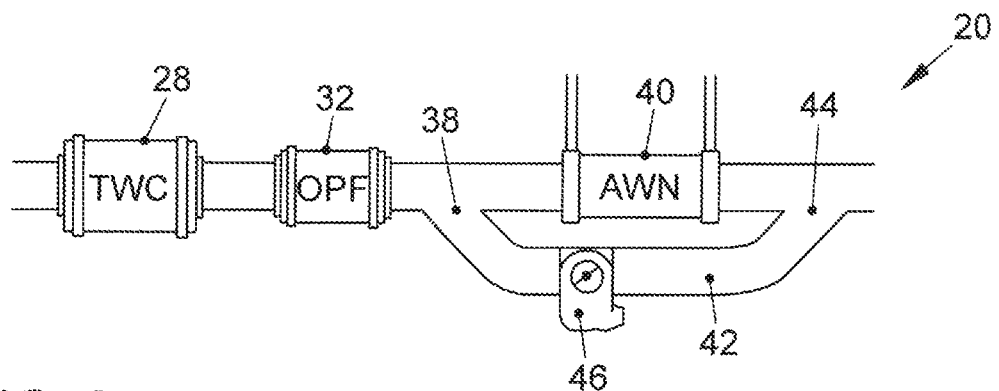
FIG. 3: another embodiment of an exhaust gas aftertreatment system of an internal combustion engine according to the invention, with an additional particulate filter.

FIG. 3 shows another embodiment of an exhaust gas system 20 of an internal combustion engine according to the invention. With an essentially identical structure as shown in FIG. 2, the second three-way catalytic converter 30 in this embodiment has been replaced by a particulate filter 32. As an alternative, instead of a particulate filter 32, it is also possible to use a four-way catalytic converter that combines the functionality of a particulate filter 32 with the functionality of a three-way catalytic converter 30 in that a catalytically active coating is applied onto the filter element of the particulate filter 32.

Figure 4:
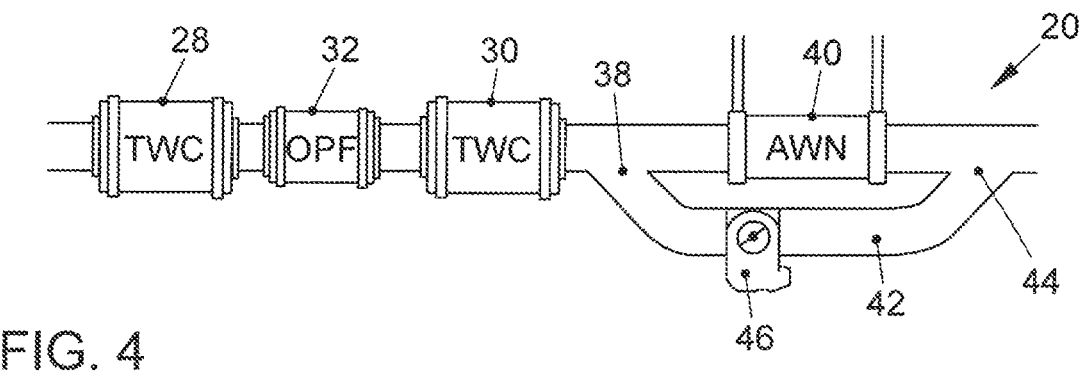
FIG. 4: another alternative of an exhaust gas aftertreatment system of an internal combustion engine according to the invention, with two three-way catalytic converters and a particulate filter.
Figure 5:
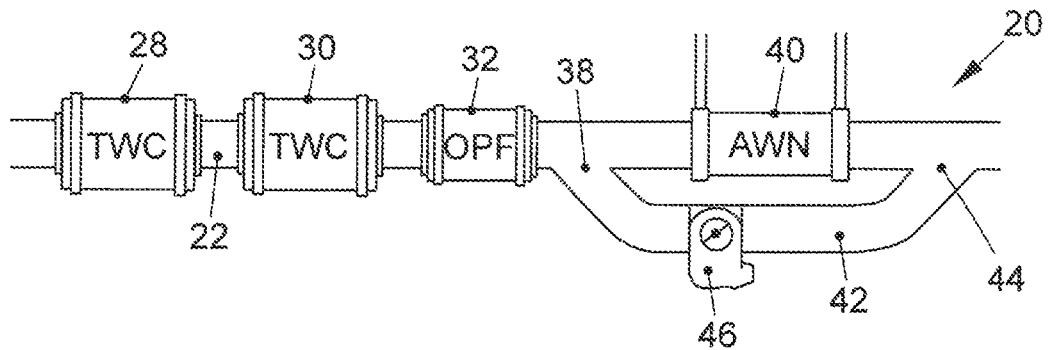
FIG. 5: another preferred variant of an exhaust gas aftertreatment system of an internal combustion engine according to the invention, with two three-way catalytic converters and a downstream particulate filter.

FIG. 4 shows another embodiment of an exhaust gas system 20 of an internal combustion engine 10 according to the invention. With an essentially identical structure to the one shown in FIG. 2, in this variant, a particulate filter 32 is additionally arranged downstream from the first three-way catalytic converter 28 as well as upstream from the second three-way catalytic converter 30. As an alternative, such a particulate filter 32 can also be arranged downstream from the second three-way catalytic converter 30 and upstream from the exhaust gas heat-recovery device 40, as shown in FIG. 5. Here, the particulate filter 32 is preferably arranged downstream from the second three-way catalytic converter 30 and upstream from the branch 38 where the bypass 42 branches off from the exhaust gas channel 22.

Figure 6:
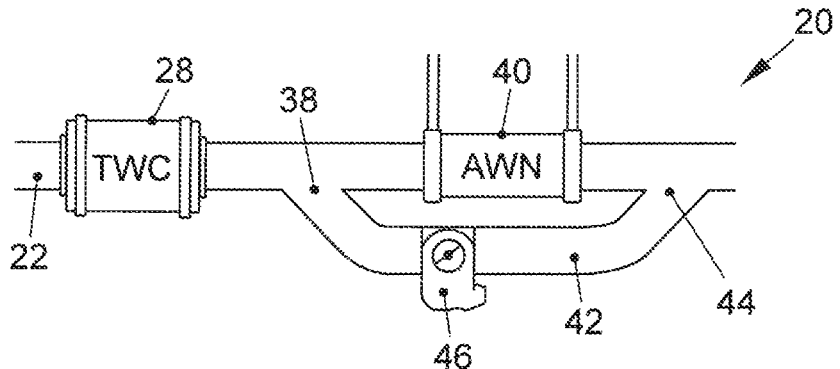
FIG. 6: another embodiment of an exhaust gas aftertreatment system of an internal combustion engine according to the invention, with only one three-way catalytic converter and a downstream exhaust gas heat-recovery system having a bypass for the exhaust gas heat-recovery device.

FIG. 6 shows another embodiment of an exhaust gas aftertreatment system of an internal combustion engine according to the invention 10. With an essentially identical structure to the one shown in FIG. 2, there is no second three-way catalytic converter 30 in this embodiment. As an alternative, in a simplified configuration of the embodiments shown in FIGS. 2 to 5, the bypass 42 for the exhaust gas heat-recovery device 40 can also be dispensed with, so that the exhaust gas from the internal combustion engine 10 can flow through the exhaust gas heat-recovery device 40 in every operating state of the internal combustion engine 10.

Figure 7:
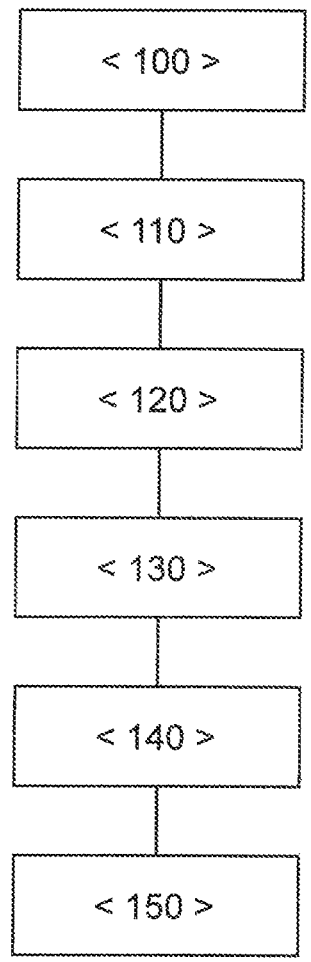
FIG. 7: a flow chart of a method according to the invention for operating an internal combustion engine, with an exhaust gas aftertreatment system.

FIG. 7 shows a flow chart for carrying out a method according to the invention for operating an internal combustion engine 10. Here, in a first method step <100>, the internal combustion engine 10 is operated in a normal mode of operation, during which all of the combustion chambers 12, 14, 16, 18 are operated at a stoichiometric air-fuel ratio $\lambda=1$. In a method step <110>, the exhaust gas temperature $T_{EG}$ or the temperature of an exhaust gas aftertreatment component 28, 30, 32 in the exhaust gas system 20 is determined. In a method step <120>, the exhaust gas temperature $T_{EG}$ or the component temperature determined in this manner is compared to a threshold temperature $T_S$. If the exhaust gas temperature $T_{EG}$ of the component is below this threshold temperature $T_S$, then in a method step <130>, the internal combustion engine 10 is operated in a lambda-split method in which a first group of combustion chambers 12, 14 of the internal combustion engine 10 is operated at a substoichiometric air-fuel ratio $\lambda<1$ and a second group of combustion chambers 16, 18 is operated at a superstoichiometric air-fuel ratio $\lambda>1$. In this process, the unburned fuel components are exothermally reacted with residual oxygen on the catalytically active surface of the three-way catalytic converter 28, as a result of which the three-way catalytic converter 28 and the exhaust gas stream downstream from the three-way catalytic converter 28 are heated up. In a method step <140>, the exhaust gas heat-recovery device 40 extracts a portion of this thermal energy from the exhaust gas stream and converts it into electric energy or mechanical energy. In a method step <150>, the internal combustion engine 10 is once again operated in the normal mode of operation when a second threshold temperature $T_{S2}$ is exceeded. In this context, if the load and the exhaust gas temperatures are commensurately high, the exhaust gas stream can continue to be conveyed through the exhaust gas heat-recovery device 40 in order to extract a portion of the heat from the gas and convert it into electric energy or mechanical energy in this operating state as well.

LIST OF REFERENCE NUMERALS 10 internal combustion engine
12 first combustion chamber
14 second combustion chamber
16 third combustion chamber
18 fourth combustion chamber
19 outlet
20 exhaust gas aftertreatment system
22 exhaust gas channel
26 turbine
28 first three-way catalytic converter
30 second three-way catalytic converter
32 particulate filter
34 first lambda sensor/wideband sensor
36 second lambda sensor/Nernst sensor
38 branch
40 exhaust gas heat-recovery device
42 bypass
44 opening
46 exhaust gas valve
48 temperature sensor
50 engine control unit

The invention claimed is:

1. A method for operating an internal combustion engine which has at least two combustion chambers and whose outlet is connected to an exhaust gas system, wherein the internal combustion engine is capable of being operated with compressed natural gas, liquified natural gas or biogas, whereby the exhaust gas system has an exhaust gas channel in which at least one three-way catalytic converter is arranged in the flow direction of the exhaust gas of the internal combustion engine and in which an exhaust gas heat-recovery device is arranged downstream from the three-way catalytic converter, comprising:
    determining an exhaust gas temperature, and
    when the exhaust gas has fallen below a threshold temperature:
        operating a first combustion chamber of the internal combustion engine at a substoichiometric air-fuel ratio ($\lambda<1$) and a second combustion chamber at a superstoichiometric air-fuel ratio ($\lambda>1$),
        exothermally reacting the unburned fuel components from the first combustion chamber of the internal combustion engine with the residual oxygen from the second combustion chamber,
        whereby the exhaust gas temperature is raised so that the exhaust gas heat-recovery device can recover a portion of the exhaust gas enthalpy downstream from the three-way catalytic converter,
        flowing the exhaust gas through the exhaust gas heat-recovery device, and
        causing the exhaust gas to bypass the exhaust gas heat-recovery device when a power uptake of the exhaust gas heat-recovery device or an amount of heat transfer via the exhaust gas heat-recovery device exceeds a predetermined threshold.

2. The method according to claim 1, wherein the exhaust gas heat-recovery device functions on the basis of a Clausius-Rankine process.

3. The method according to claim 1, further comprising converting the energy recovered by means of the exhaust gas heat-recovery device into mechanical energy.

4. The method according to claim 1, further comprising converting the energy recovered by means of the exhaust gas heat-recovery device into electrical energy.

5. The method according to claim 1, wherein the first combustion chamber or a group of first combustion chambers is operated at a substoichiometric air-fuel ratio and wherein the second combustion chamber or a second group of combustion chambers is operated at a superstoichiometric air-fuel ratio, whereby a stoichiometric exhaust gas is established downstream from the outlet of the internal combustion engine.

6. An internal combustion engine comprising:
    at least a first combustion chamber, and at least a second combustion chamber,
    an outlet of the internal combustion engine connected to an exhaust gas system,
    wherein the exhaust gas system has an exhaust gas channel in which at least one three-way catalytic converter is arranged in the flow direction of an exhaust gas of the internal combustion engine through the exhaust gas channel, and
    wherein an exhaust gas heat-recovery device is arranged downstream from the three-way catalytic converter, and
    an engine control unit that is configured to carry out a method according to claim 1 when a machine-readable program code is executed by the engine control unit.

7. The internal combustion engine according to claim 6, further comprising a particulate filter installed downstream from the three-way catalytic converter and upstream from the exhaust gas heat-recovery device.

8. The internal combustion engine according to claim 6, further comprising a bypass installed in order to bypass the exhaust gas heat-recovery device, thus making it possible for the exhaust gas of the internal combustion engine to bypass the exhaust gas heat-recovery device.

9. The internal combustion engine according to claim 8, wherein an exhaust gas valve is installed in the bypass.

10. The internal combustion engine according to claim 6, further comprising a second three-way catalytic converter arranged downstream from the three-way catalytic converter and upstream from the exhaust gas heat-recovery device.

11. The internal combustion engine according to claim 10,
   further comprising a bypass installed in order to bypass the exhaust gas heat-recovery device, thus making it possible for the exhaust gas of the internal combustion engine to bypass the exhaust gas heat-recovery device,
   wherein, downstream from the second three-way catalytic converter, the bypass branches off from the exhaust gas channel at a branch and then, downstream from the exhaust gas heat-recovery device, opens up again into the exhaust gas channel at an opening.

12. The internal combustion engine according to claim 6, wherein the internal combustion engine is as an internal combustion engine charged by means of at least one turbocharger and operated with a gas.

* * * * *